Sept. 14, 1965  C. T. ROTH ETAL  3,205,769
MICROFILM SCANNING, POSITIONING AND PROJECTION APPARATUS
Filed Sept. 24, 1962  7 Sheets-Sheet 1

INVENTOR.
CHARLES T. ROTH
GORDON P. TAILLIE
BY
ATTORNEY

INVENTOR.
CHARLES T. ROTH
GORDON P. TAILLIE
BY
ATTORNEY

Sept. 14, 1965   C. T. ROTH ETAL   3,205,769
MICROFILM SCANNING, POSITIONING AND PROJECTION APPARATUS
Filed Sept. 24, 1962   7 Sheets-Sheet 5

INVENTOR.
CHARLES T. ROTH
GORDON P. TAILLIE
BY
ATTORNEY

INVENTOR.
CHARLES T. ROTH
GORDON P. TAILLIE

ATTORNEY

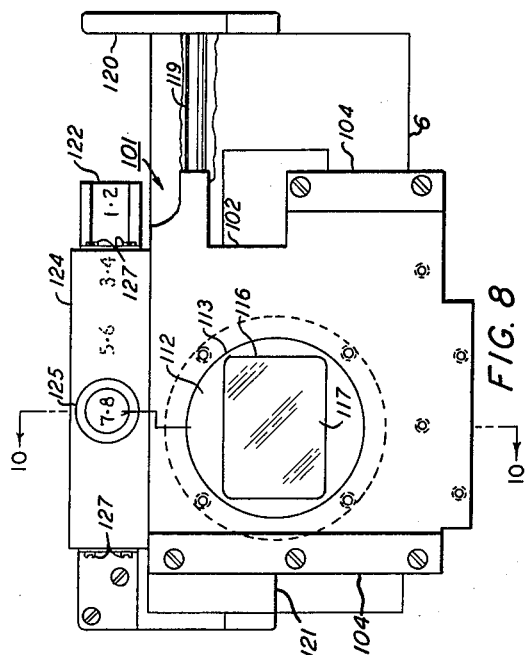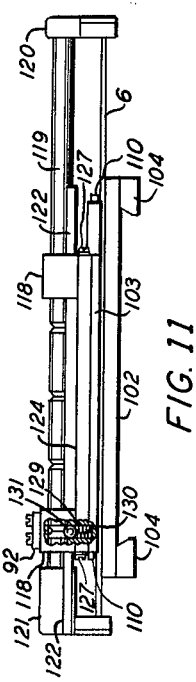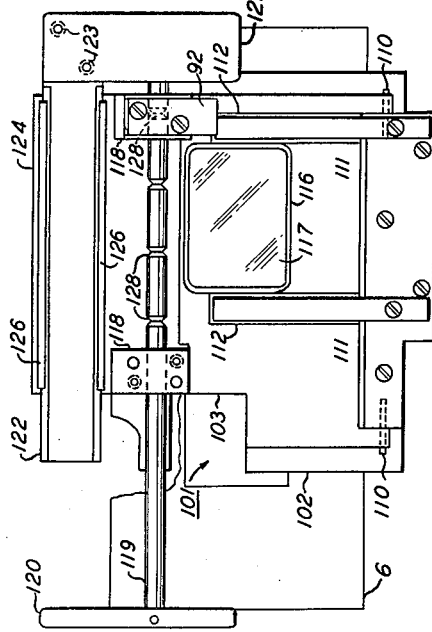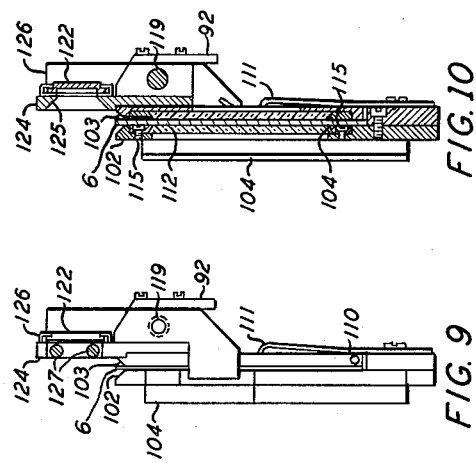
INVENTOR.
CHARLES T. ROTH
GORDON P. TAILLIE
BY
ATTORNEY United States Patent Office 3,205,769
Patented Sept. 14, 1965

3,205,769
MICROFILM SCANNING, POSITIONING AND PROJECTION APPARATUS
Charles T. Roth and Gordon P. Taillie, Rochester, N.Y., assignors to Xerox Corporation, Rochester, N.Y., a corporation of New York
Filed Sept. 24, 1962, Ser. No. 225,752
1 Claim. (Cl. 88—24)

This invention relates to apparatus used to optically scan microfilm mounted in apertures of data processing cards.

Specifically, this invention relates to improved microfilm projection apparatus that scans microfilm mounted in an aperture of a data processing card and projects a light image of the microfilm onto a revolving xerographic drum. The data processing cards, herein referred to as aperture cards, contain one or more reproducible images on a strip of microfilm. The scanning mechanism must be capable of selectively positioning the aperture card so that the proper image, or images, may be projected onto the xerographic drum. An automatic xerographic reproducing machine of the type suitable for use with the present invention is disclosed in the copending application of Robert A. Hunt and Gordon P. Taillie, S.N. 46,463, filed August 1, 1960, now Patent No. 3,078,770.

The widely accepted use of aperture cards as a means of storing data has not only increased the use of aperture cards but the use of multiple images on a single aperture card, thus resulting in the necessity of being able to selectively reproduce images on a given card without reproducing the entire card.

It is therefore the primary object of this invention to improve optical scanning and projection apparatus for use with multi-image aperture cards.

It is a further object of this invention to improve microfilm scanning apparatus, for use in xerographic reproducing apparatus to permit scanning of selected images from a multi-image data processing card.

It is a further object of this invention to improve scanning and projection apparatus used in automatic xerographic reproducing machines so that a card holder containing a data processing card with microfilm images therein may be manually positioned within the projection apparatus to selectively scan a predetermined image without requiring a visual alignment of the image by the operator.

These and other objects of this invention are attained by means of a movable carriage mounted in a projector and containing an adjustable aperture card holder. The card holder is capable of being selectively positioned in the carriage and the carriage is movable relative to the projector lens, thereby enabling the desired, predetermined location on the aperture card to be scanned by the projector lens.

For a better understanding of the invention as well as other objects and further features thereof, reference is had to the following detailed description of the invention to be read in connection with the accompanying drawings, wherein:

FIG. 7 is a front view of the card holder;

FIG. 8 is a rear view of the card holder;

FIG. 9 is a right-hand side view of the card holder;

FIG. 10 is a left-hand side view of the card holder; and

FIG. 11 is a top view of the card holder.

Figure 1:
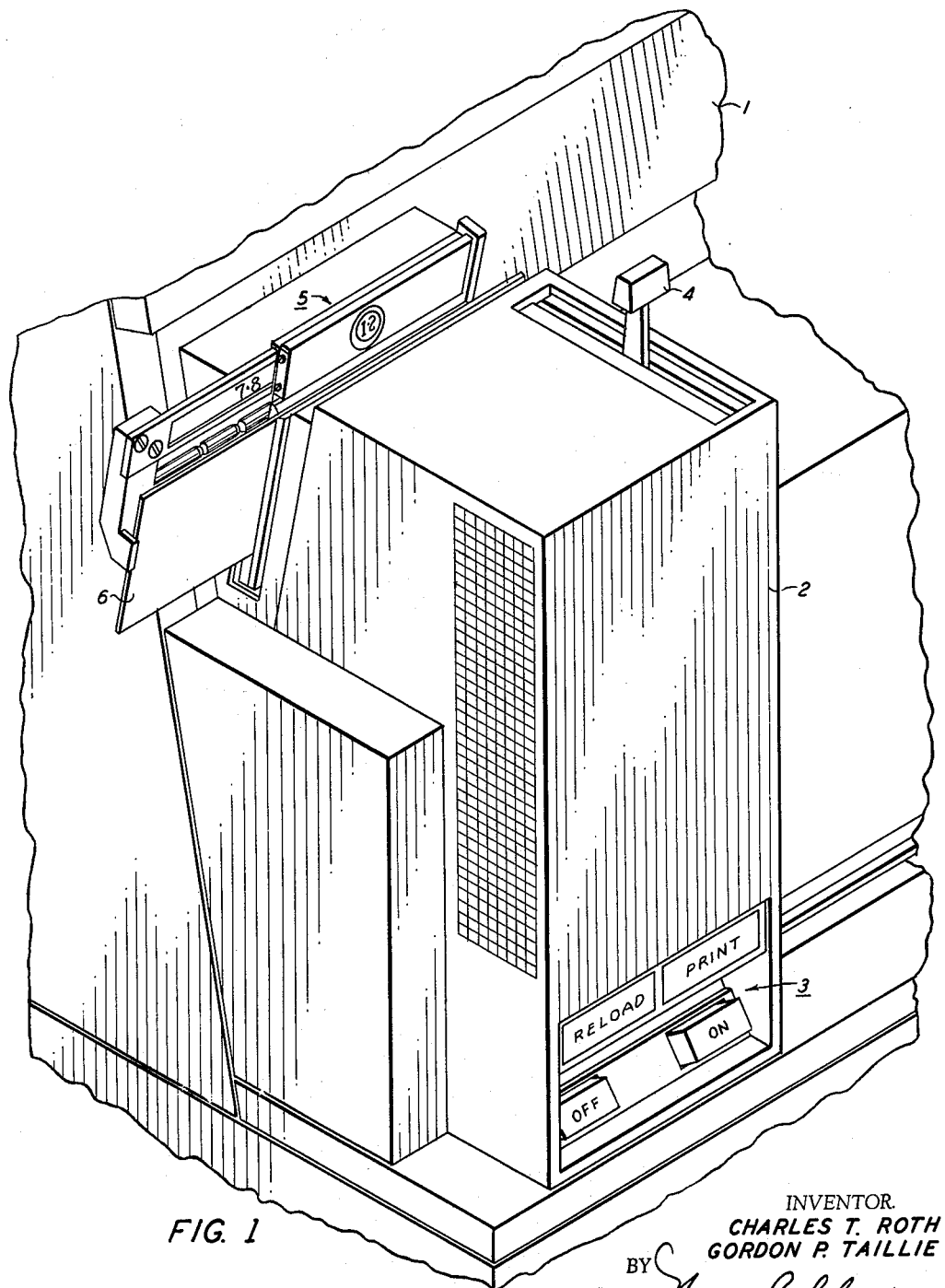
FIG. 1 is a perspective view of an optical projector containing the present invention.
Figure 2:
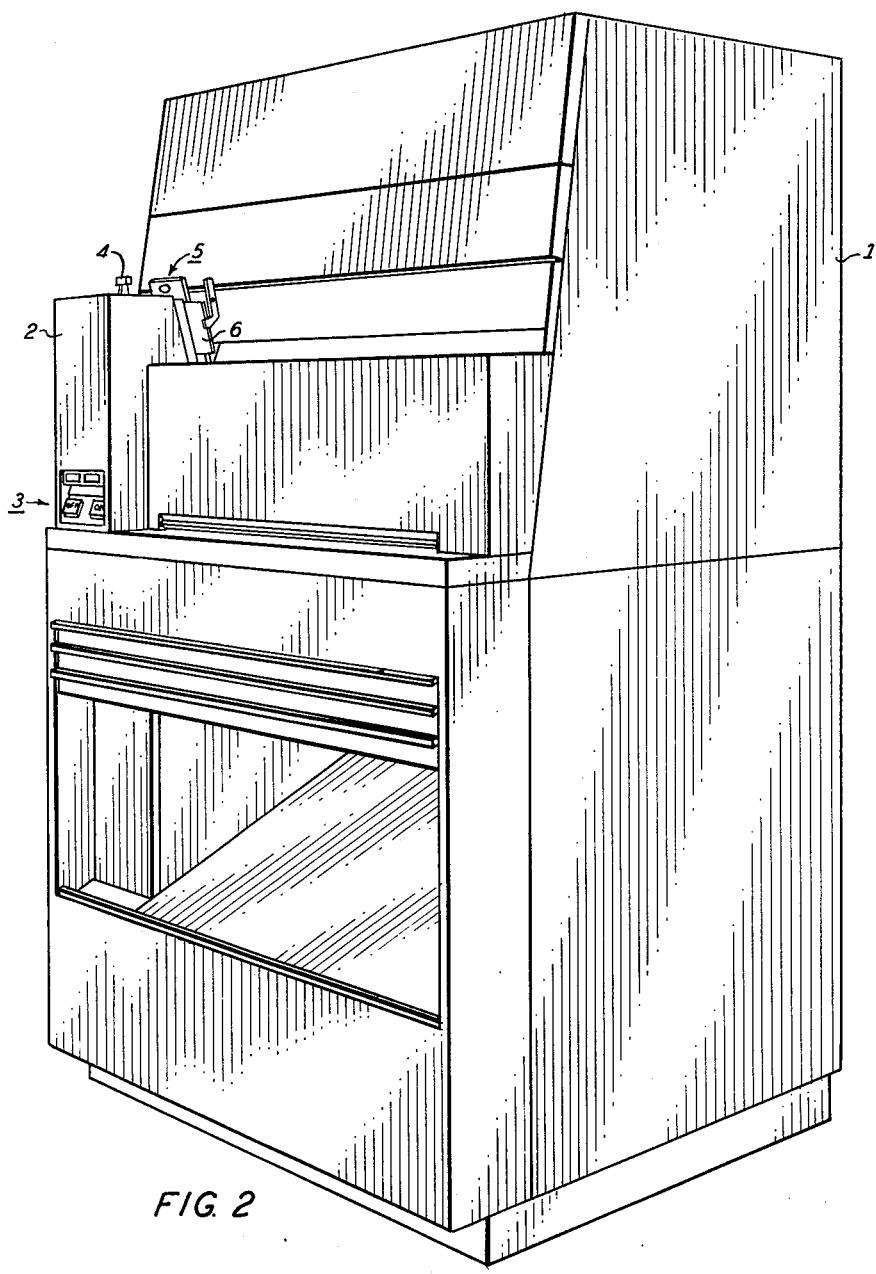
FIG. 2 is a perspective view of an automatic xerographic reproducing machine suitable for use with an optical projector containing the present invention.

As seen in FIGS. 1 and 2, a xerographic copier of the type disclosed in Patent No. 3,078,770, generally designated 1 and containing an exposure mechanism 2 is used to illustrate the invention disclosed herein.

The exposure mechanism of the xerographic copier of this invention is adapted to scan the object to be reproduced and to project an enlarged flowing image of the object onto the rotating xerographic drum in synchronization with the rotation of the xerographic drum. In this type of projection apparatus, the scanning of the object is accomplished by means of a movable carriage, generally designated 5, supporting the objects to be reproduced and moved relative to an optical system in synchronization with the rotation of the xerographic drum. Control panel 3 controls the operation of the xerographic apparatus and the exposure mechanism. Specifically, referring to FIGS. 3, 4 and 5, the optical scanning mechanism or projector 2, includes a main projector casing 7, which can be formed as an integral part of the main frame of the xerographic apparatus or formed as a separate element secured to the frame of the xerographic apparatus, a lamp assembly 8, a condenser lens assembly 9, and a projector lens assembly 10 all in alignment with each other and with the carriage assembly 5 carrying the copy 6 to be scanned.

In the description of the projector, when reference is made to the front of the projector, it is to be understood that this means the output end or lens end of the projector, without reference to its location on the xerographic apparatus.

The lamp assembly 8 includes a projector lamp LMP-1 positioned in a conventional lamp socket and bracket assembly 11. Both the lamp and the lamp socket assembly are partially enclosed by a lamp housing 12, having secured thereto a conventional reflector 13 and a heat filter 14.

The lamp assembly is secured to the top of the main projector casing with the lamp housing positioned over an opening therein which serves as a conduit connecting the outlet 15 of a motor driven blower unit 16 used to dissipate heat generated by the lamp LMP-1. When the projection lamp is energized, light from this lamp passes through the lens 17 of the condenser lens assembly 9 to illuminate the copy to be reproduced. The condenser lenses are suitably spaced and aligned within a condenser lens housing 18 and secured therein by lock ring 19.

Copy to be scanned, such as microfilm carried in a suitable copy holder, is supported in carriage assembly 5 for movement in a plane perpendicular to the axis of the condenser lens. The copy is scanned to project a flowing image of the object through the projection lens assembly 10.

The carriage is driven in one direction to scan the object to be copied by means of a scan bar 20 adapted to be forced into frictional contact with a continuously rotating roller 21. The scan bar 20 is secured to a holder 22 which is pivotally secured to the carriage by means of a scan bar stud 23. Stud 23 passes through a bearing bar 24, the holder 22, and extends beyond the edge of the holder 22 to receive a retaining ring 26. The bearing bar 24 is mounted on a carriage shaft 35 which support and guides the carriage assembly during the scanning movement.

The carriage 105 is fastened to the bearing bar 24 by means of screws 106. The upper end of the carriage 5 is guided in a path perpendicular to the axis of the condenser lens by means of a carriage guide 27 secured to the back side of the carriage assembly 5 between a pair of bearings 28. To support the bearings 28, there is provided a top plate 29 secured to the condenser lens housing 18. The top plate 29 contains a bearing plate 30 secured thereon. The bearings 28 are held in place by bearing retaining screws 31, threaded into the top plate 29.

To effect return of the carriage to its original starting position, there is provided a return spring 32 encircling the spring support rod 33, secured to the side walls of the projector casing. The return spring 32 is retained at one end by the wall of the projector casing and at its other end contacts spring plate 34, secured to the carriage plate, suitable apertures being formed in the spring plate for the passage of spring support rod 33 and carriage shaft 35.

Figure 6:
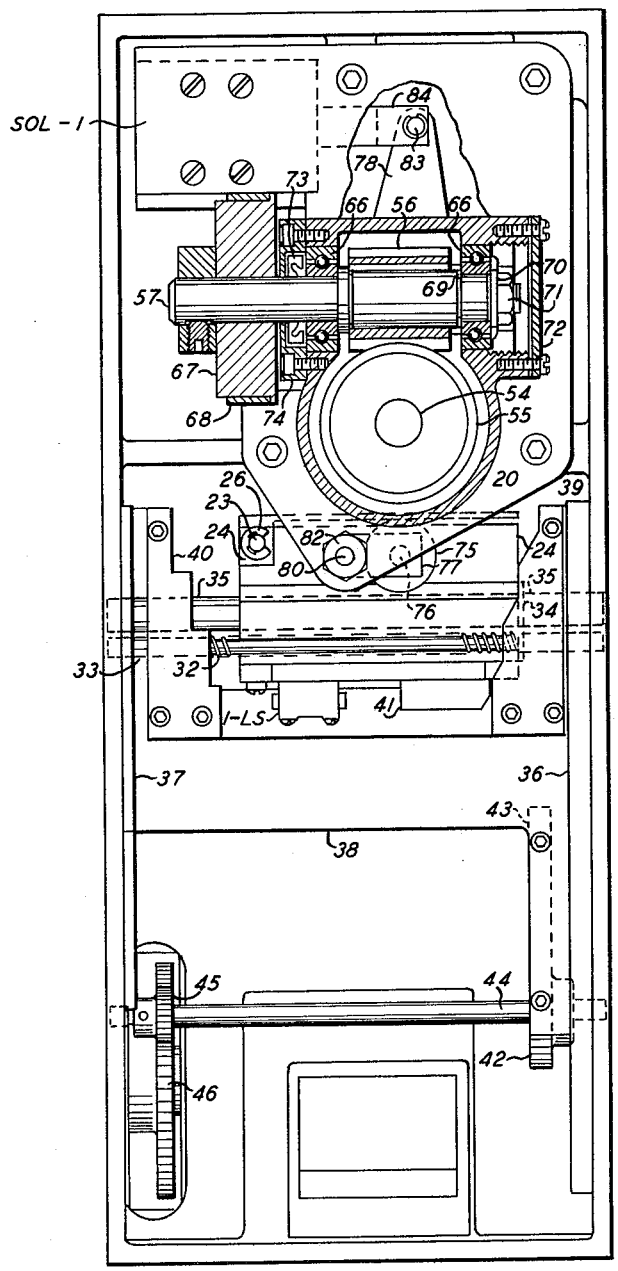
FIG. 6 is a sectional view of the projector taken along line 6—6 of FIG. 4.

To regulate the length of travel of the carriage with respect to the size or number of drawings to be reproduced from the microfilm, there is movably positioned on guides 36 and 37 secured to the side walls of the main projector casing, a cam plate 38, having mounted on its left-hand side (right-hand side as seen in FIG. 6), a carriage return stop cam 39 and on its right-hand side (left-hand side as seen in FIG. 6), a scan limit plate 40, which are used to define the start-of-scan position and an end-of-scan position, respectively, of the carriage. The length of travel of the carriage is best controlled by varying the starting and stopping position by means of the return stop cam 39 and the scan limit plate 40. The carriage movement is controlled with respect to these elements by means of a cam follower 41, secured to the carriage plate in position to ride against the cam 39.

The length of scan of the carriage is regulated by the manually manipulated selector lever 4, used to rotate a pinion 42 which engages a rack 43 secured to the cam plate 38. Pinion 42 is secured to one end of a shaft 44 suitably journaled in the projector casing. The other end of the shaft carries a gear 45, which meshes with gear 46, secured to the shaft 47 on which the selector lever 4 is secured. The shaft 47 is suitably journaled in a selector gear housing 48.

A bracket 49 having a scale 50 thereon indicating the proper position of the selector lever for scanning a particular size image on the microfilm is secured to the top of the projector casing, and is mounted on the outside of the projector covers. In the embodiment disclosed, the projector is adapted to scan four positions labeled A, B, C, and D. The selector lever is maintained in any preselected position by means of a ball 51 engaging suitably positioned depressions in detent block 52, secured to the selector gear housing. The ball 51 is biased toward the detent block by a spring (not shown) retained in the selector lever. Travel of the selector is limited by means of lever stops 53 positioned at opposite ends of the detent block.

Roller 21, which drives the carriage by frictional contact with the scan bar 20, is secured to shaft 54, which carries one gear 55 meshing with worm 56 carried by drive shaft 57. Shaft 54 is journaled by bearings 58 positioned in cover 60 of gear housing 59, and in the outer wall of gear housing 59. The bearings 58 are retained by a threaded lock ring 61. Axial alignment of shaft 54 is maintained by nut 62, disposed against bearing retaining washer 63 at the threaded end of the shaft, and by bearing spacer 64 and retaining ring 65 mounted in a suitable groove at the opposite end of the shaft.

Drive shaft 57, journaled by a pair of bearings 66 mounted in the gear housing (FIG. 6) carries a pulley and hub assembly 67 driven by a belt 68, at a predetermined speed relative to the xerographic drum in the xerographic apparatus.

As shown in FIG. 6, worm 56 butts at one end against a shoulder of shaft 57 and at its other end against a spacer 69 interposed between the worm and a bearing 66 at the threaded end of the shaft. The axial alignment of the shaft 57 is maintained by bearing retaining washer 70 forced into contact with the interface of the bearing by nut 71. Removable bearing caps 72 are secured to the gear housing to seal the nut ends of shafts 57 and 54. To eliminate dust from entering the gear housing, the drive end of shaft 57 is sealed by means of a shaft seal 73 enclosed by a seal retained 74 suitably secured to the gear housing.

To force the scan bar 20 of the carriage into frictional contact with the roller 21 to effect a scan movement of the carriage, there is provided a pressure roller 75, here shown as a bearing, mounted on a bearing pin 76 in a bifurcated pressure lever 77. A solenoid operated lever 78 is also held on pin 76 by retaining rings 79 positioned in suitable grooves at the opposite ends of the bearing pin.

The lever 78 is pivotally secured at one end to the gear housing by a pivot stud 80 which passes through the lever 78, pressure lever 77 and the gear housing 59. The pivot stud 80 is retained therein by means of a retaining ring (not shown) at one end of the pivot stud and by means of a washer 81 and a nut 82, the latter being threaded onto the end of the pivot stud.

The lever 78 is connected at its opposite end by a connective pin 83 to the plunger 84 of the solenoid SOL-1 attached to the gear housing, whereby as the solenoid is energized the lever is pivoted about the axis of the pivot stud 80 thereby rotating the pressure roll against the scan bar 20 to force it into frictional driving contact with the roller 21. The lever 78 has an aperture formed therein to permit it to be moved relative to the roller 21 over which it is positioned.

As the carriage is advanced by the frictional drive between the scan bar 20 and the roller 21, the limit switch 1LS attached to the carriage contacts the end-of-scan limit plate 40, whereby the limit switch is actuated to break the circuit to the solenoid SOL-1. As the solenoid is de-energized, the contact force supplied to the scan bar is released to permit the carriage to be returned by spring 32 to the start-of-scan position.

Figure 3:
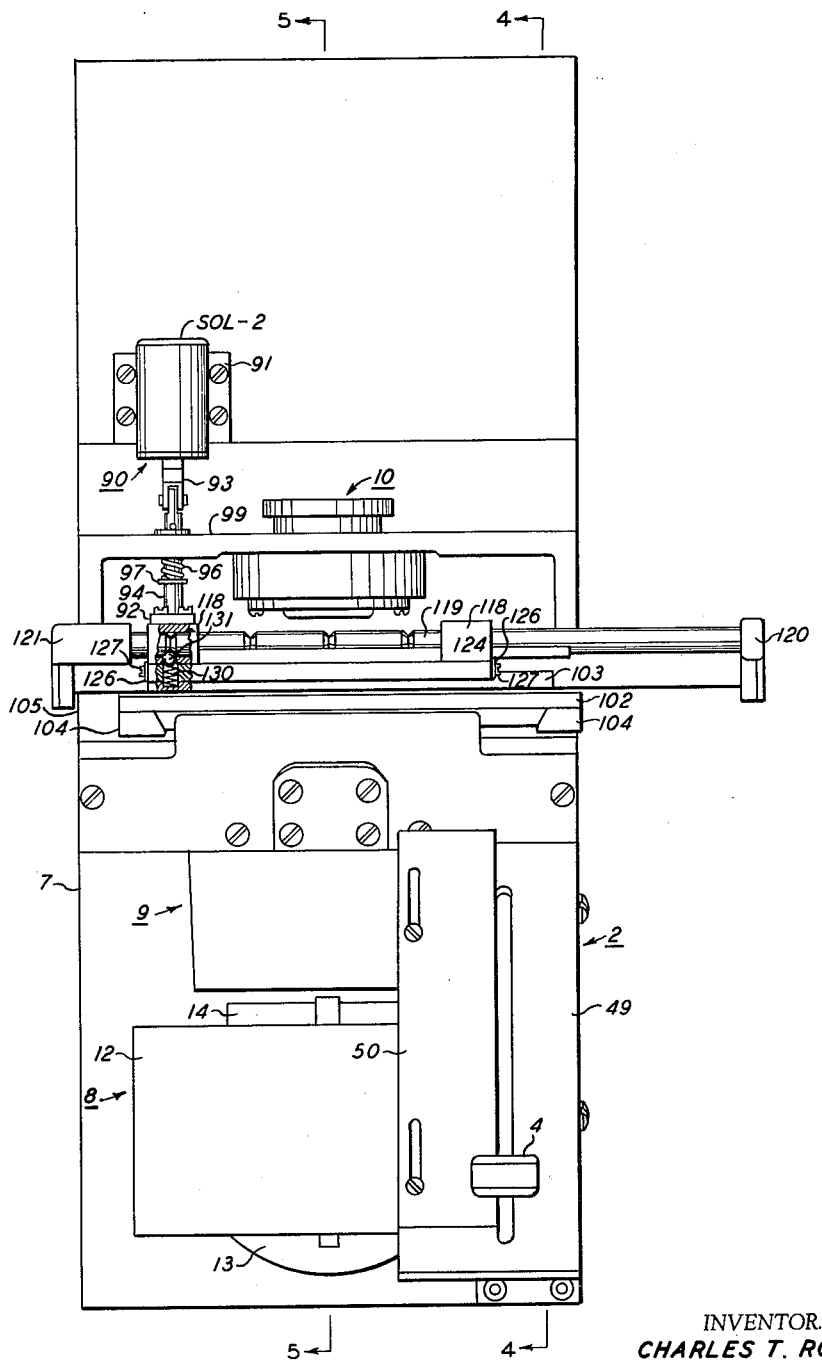
FIG. 3 is a top view of the projector of FIG. 1, with the exterior covers removed.
Figure 5:
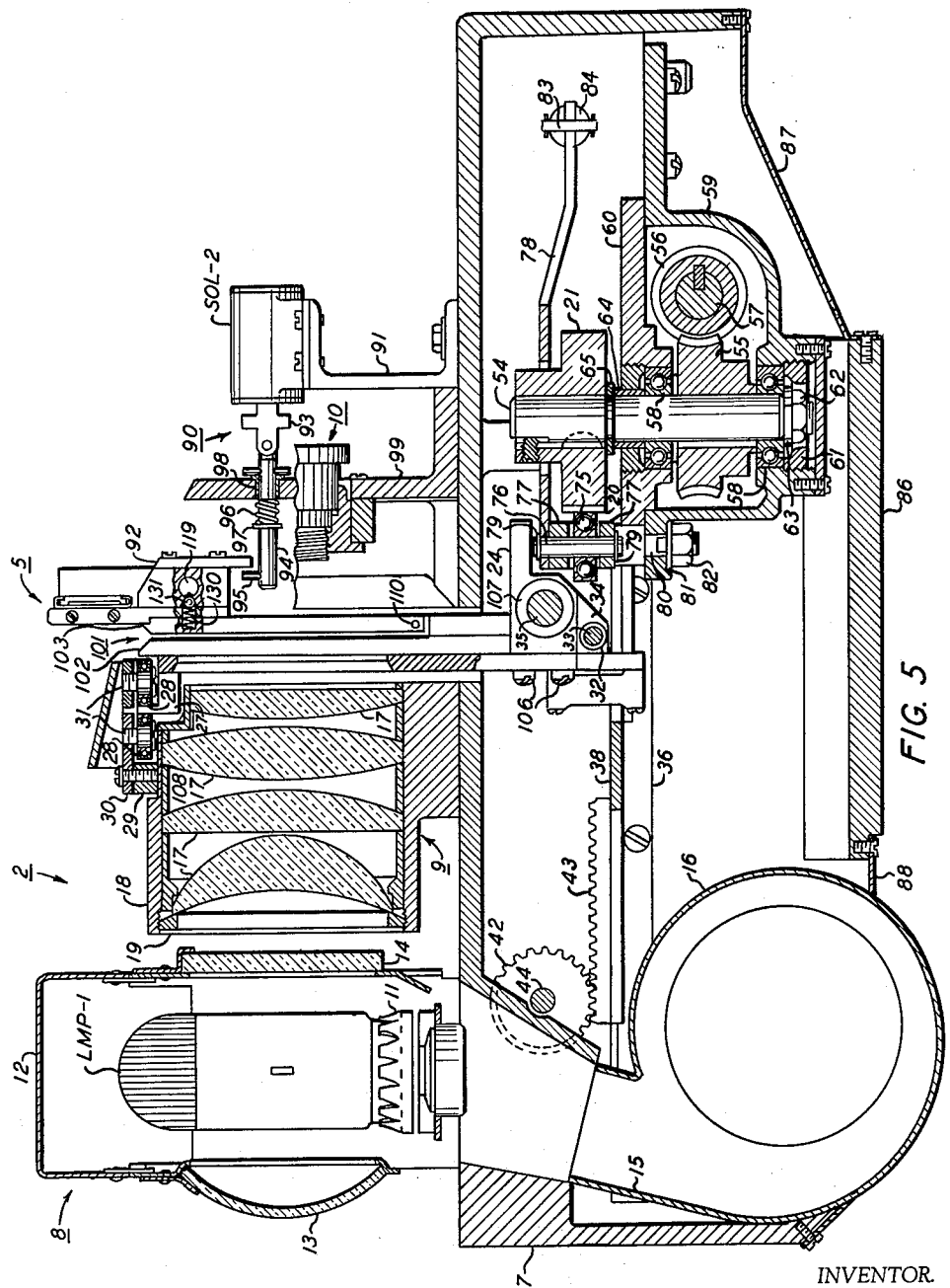
FIG. 5 is a sectional view of the projector taken along line 5—5 of FIG. 3.

To facilitate the insertion of a card into the card holder 101, and to prevent adjustment of the card while it is clamped in the holder, and thus possibly scratching or damaging the microfilm surface, an automatic carriage release assembly 90 is provided to open the carriage when it returns to the start-of-scan position. As seen in FIGS. 3 and 5, a solenoid SOL-2 is mounted on a bracket 91 on projector casing 7. A tab 92 is fastened to the front of one of the bearing blocks 118 on the front plate 103 of the card holder 101 and extends downward below the bottom of the bearing block. The solenoid plunger 93 is connected to an actuating rod 94 which contains a pin 95 that extends upward beyond the bottom of tab 92. The pin 95 is normally on the carriage side of the tab 92 when the solenoid is in an inactivated position and when moved in a horizontal direction will contact the tab 92 if the carriage is in the start-of-scan position. When the solenoid is de-activated a spring 96 on rod 94 pushes against a spring retainer 97 moving the rod 94 and pin 95 toward the carriage and out of contact with the tab 92. The rod 92 is slidably mounted in a bushing 98 in the projector lens support member 99. A switch (not shown) is actuated by the return stop cam 39 when the carriage returns to the start-of-scan position and in turn actuates solenoid SOL-2 within drawing plunger 93 and rod 94. As rod 94 moves toward the solenoid the pin 95 pulls tab 92, opening the card holder front plate 103. The operator may now place a card in the card holder 101 and actuate a new cycle. As the new cycle starts the switch is released de-activating the solenoid SOL-2 and permitting the card holder to close clamping the card in position.

To protect the elements of the projector mounted within the casing from dust and other foreign objects, the bottom of the projector casing is closed by means of a base plate 86, a front dust cover 87 and a rear dust cover 88.

Figure 4:
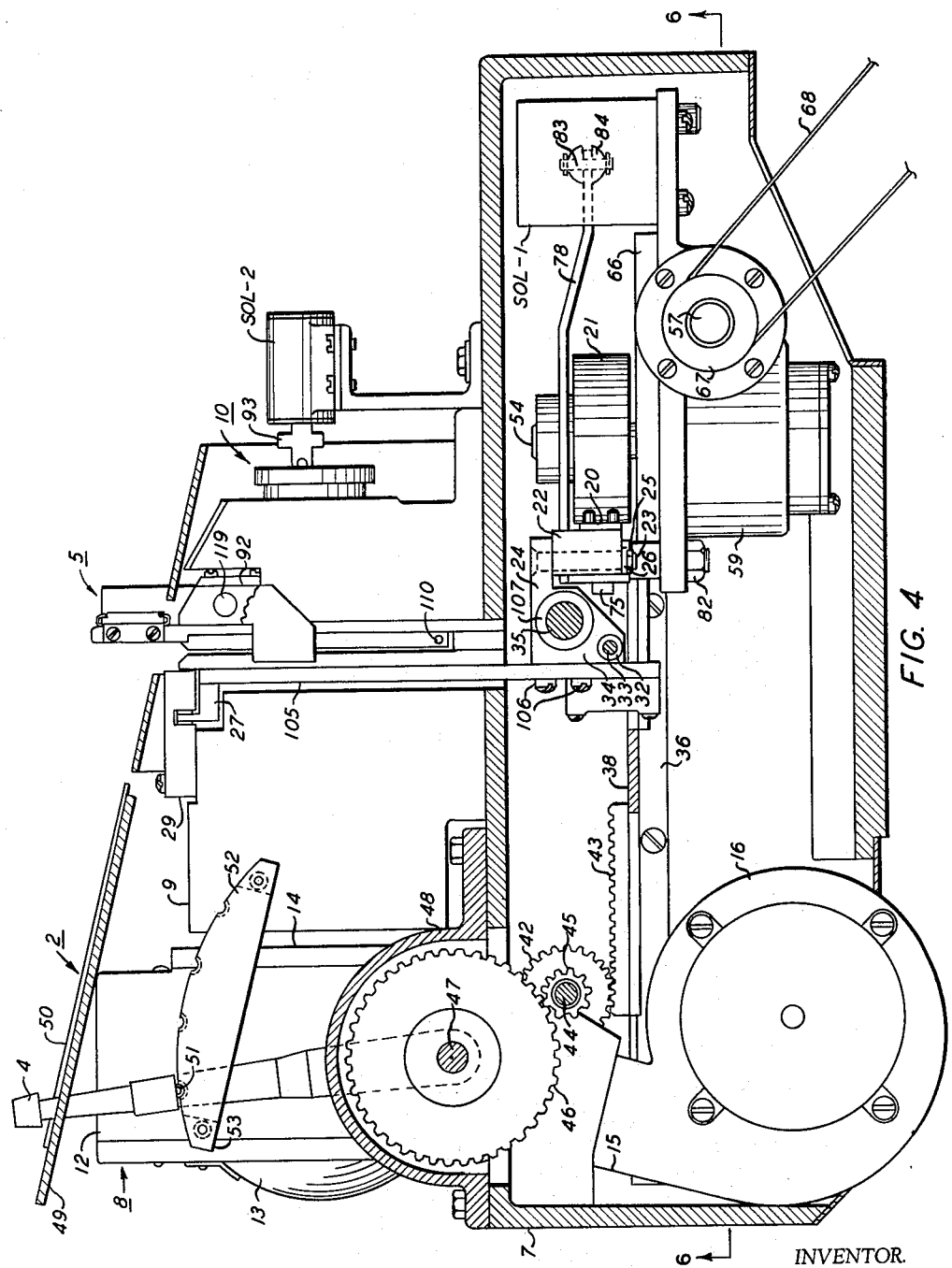
FIG. 4 is a sectional view of the projector taken along line 4—4 of FIG. 3.

In FIGS. 1 through 6, the carriage and card holder are shown assembled in the projector and in FIGS. 7 through 11, the carriage and card holder are shown in detailed form. The carriage assembly 5 contains a card holder 101 consisting of a back plate 102 and a front plate 103. Attached to back plate 102 are dove tail members 104 which mate with vertical dove tail guides on an apertured carriage plate 105. As seen in FIGS. 4 and 5, the carriage plate 105 is movably supported by a bearing block 24 by means of screws 106. The bearing block rides on the carriage shaft 35 secured in the side walls of the projector casing, the bearing block being suitably journaled on the shaft by means of bushing 107. The upper end of the carriage plate is guided in a path perpendicular to the axis of the condenser lens by means of a carriage guide 27 secured to the back side of the carriage plate riding between bearing 28.

Fastened to the back plate 102 is a block member 109 containing a pair of pivot pins 110 and a pair of leaf springs 111. The pivot pins 110 are journaled in the front plate 103 of the card holder, and the leaf springs fit grooves 112 in the front side of the front plate 103. Front plate 103 is held in position by springs 111 and pivots about pins 110.

A circular piece of glass 112 is held in an aperture 113 of back plate 102 by mean of a glass retaining ring 114 and screws 115. A rectangular aperture 116 in the front plate 103 contains a glass window 117 aligned with the condenser lens 17, the circular aperture 113 in the back plate, and the projector lens 10. Mounted on the front plate 103 are bearing blocks 118 to provide sliding support for a positioning rod 119. Positioning rod 119 contains card guides 120 and 121 mounted on either end.

Card guide 121 is fastened to a number plate 122, by means of screws 123. The number plate 122 as shown in FIG. 8, contains four groups of numbers 1-2, 3-4, 5-6 and 7-8. An index plate 124 is fastened to the top of front plate 103, and contains a beveled aperture 125. The aperture 125 is large enough to read any one group of two numbers on the number plate and is aligned so that the number plate is moved relative to the index plate and the various groups of numbers pass behind the aperture. The number plate 122 is slideably connected to the index plate by means of a metal clip 126 held to the index plate by screws 127. As the positioning rod 119 is moved in either direction perpendicular to the axis of the condenser lenses, the number plate is moved, by means of card guide 121, through clip 126, relative to index plate 124.

Positioning rod 119 contains a series of four indentations 128. One bearing block 118 contains a circular hole 129 containing a spring 130 and a ball bearing 131. The spring 130 faces against the front plate 103 and the ball 131, forcing the ball into the indentations 128 in positioning rod 119, thus providing four positive stop positions for the positioning rod 119. The four groups of numbers on number plate 122 are positioned to be viewed through aperture 125 of index plate 124 when each of the indents 128 in positioning rod 119 are held in a stop position by ball bearing 131. The number of indentations and groups of numbers shown in this embodiment is for illustrative purposes only. The actual number used would be determined by the number of images used in the aperture card and the desired number of images to be scanned at one time.

Operation

A data processing card containing an aperture for a strip of microfilm containing multiple images is placed in the card holder for projection of the microfilm images onto a xerographic drum. An operator pushes the front plate 103 toward the xerographic machine 1, causing the plate to pivot about pins 110, thus providing an opening between front plate 103 and back plate 102. The aperture card is inserted between the plates so that the microfilm image is aligned with apertures 116 and 113 in the front and back plates, respectively. The card is horizontally positioned between the card guides 120 and 121. By holding the front plate 103 away from the back plate and moving the positioning rod 119 and card guides 120 and 121 either right or left, the aperture card may be positioned to any one of the four positive stop positions produced by the indents 128 on the positioning rod. When the ball bearing 131 is seated in the appropriate indent, the front plate is released and leaf springs 111 force the front plate 103 against back plate 102 holding the aperture card rigidly in position. At this point, two of the images on the microfilm are aligned with the apertures 113 and 116 and the appropriate set of numbers on number plate 122 is visible through aperture 125 of the index plate 124, thus visually indicating which images are being scanned. The selector lever 4, as seen in FIGS. 3 and 4, is set at the desired position to effect the necessary length of scan. If all the images in the aperture cards are of the same size, the selector lever arm 4 may be secured in one permanent position eliminating the necessity of selecting the length of scan for each image to be projected. The embodiment herein shows an aperture card with eight images, with two images being scanned at one time, however, aperture cards containing various numbers of images and images of various sizes may be used merely by varying the number of indentations 128 in positioning rod 119 and using selector lever 4 to adjust the length of scan for different size images.

The lamp LMP-1 is illuminated and solenoid SOL-1 is activated to move lever 78 bringing pressure rollers 75 against scan bar 20 and forcing the scan bar into contact with the continuously rotating roller 21. The continuously rotating roller 21 is energized from a motor (not shown) through belt 68 and pulley 67. As the scan bar 20 is forced between the pressure roller 75 and the continuously rotating roller 21, it moves bearing bar 24 perpendicular to the axis of the condenser lens. Bearing bar 24 carries with it carriage plate 105 and back and front plates 102 and 103. The microfilm image is thus moved across the focal axis of the condenser lens 17 and the projector lens 10. At the end-of-scan position, the solenoid SOL-1 is de-activated by switch 1LS releasing arm 78 and pressure rollers 75, the scan bar being forced back to its original position by spring 32. The aperture card may now be moved to another position to scan different images or it may be removed and a new card inserted.

While the present invention as to its objects and advantages, as described herein, has been carried out in specific embodiments thereof, it is not desired to be limited thereby but it is intended to cover the invention as defined in the claim.

What is claimed is:

In a microfilm projector of the type wherein a data processing card containing a plurality of microfilm images mounted in apertures in the data processing card is scanned, apparatus to position selected images in the light path of the projector and to move the selected images across the light path for scanning thereby including:

a movable card carriage mounted in the projector transversely to the light path, card clamping means mounted on the carriage for movement therewith including:

a pair of card clamping plates pivotally attached and urged into surface contact by biasing means mounted on one of the plates and means to separate the plates to permit the insertion of a card between the plates, the card clamping plates having apertures aligned with each other in the light path of the projector, card positioning means mounted one one of the clamping plates to position the card relative to the plates so that selected images on the microfilm will align with the apertures in the plates.

said positioning means including a positioning rod having a plurality of positive stopping positions in registration with the apertures in the plates, and indexing means operatively associated with the positioning rod to indicate which images in the microfilm are positioned in alignment with the apertures.

and means to drive the carriage and the card clamping means transversely to the light path to scan microfilm images in the apertures of a data processing card in the card clamping means.

References Cited by the Examiner

UNITED STATES PATENTS

| | | | |
|---|---|---|---|
| 2,473,736 | 6/49 | Stern | 88—24 |
| 2,501,453 | 3/50 | Rowe et al. | 88—24 |
| 2,609,737 | 9/52 | Markle | 88—24 |
| 2,949,813 | 8/60 | Wilton et al. | 88—24 |
| 3,078,770 | 2/63 | Hunt et al. | 95—1.7 |

NORTON ANSHER, *Primary Examiner.*

EMIL G. ANDERSON, *Examiner.*